UNITED STATES PATENT OFFICE.

ALFRED MONNIER, OF PHILADELPHIA, PENNSYLVANIA.

IMPROVED PROCESS OF PURIFYING METALLIC OXIDES.

Specification forming part of Letters Patent No. 46,924, dated March 21, 1865; Reissue No. 2,430, dated January 1, 1867.

*To all whom it may concern:*

Be it known that I, ALFRED MONNIER, of Philadelphia, in the county of Philadelphia and State of Pennsylvania, have invented a new and Improved Process for Purifying for Metallic Oxides; and I do hereby declare that the following is a full, clear, and exact description thereof, which will enable others skilled in the art to fully understand and make use of the same.

My invention is designed to facilitate the process of obtaining pure oxides of cobalt, nickel, and more especially with a view to the obtaining of pure metallic nickel.

Heretofore the purification of the impure oxides was effected by repeated solution and precipitation, to obtain them free of sulphate of lime, magnesia, silica, or the precipitant, either alone or mixed together.

The object of my invention is to obtain the pure oxides of those metals in a more economical manner; and for this end I use sulphuric acid, sulphates of potassa or soda, caustic soda or potassa, their carbonates or equivalents. To do this I proceed as follows with that class of metallic oxides which contain but a small quantity of impurities:

I first remove the sulphate of lime by calcining the hydrated oxides in crucibles, or in a reverberatory furnace; then boiling with a solution of caustic potassa or soda, or their carbonates or equivalent, (in a tank with steam heat,) whereby a double decomposition is effected, resulting in the formation of caustic or carbonate of lime and sulphate of potassa or soda. This sulphate of alkali solution being removed by filtration or decantation, a sufficient quantity of diluted acid is added to the former (caustic lime or its carbonate) to dissolve it only, the oxides of the metals proper remaining, for the most part, intact. The acid which I prefer is hydrochloric.

Secondly, to remove the magnesia, I calcine the oxides (treated as above and free of sulphate of lime) at a red heat in crucibles in a reverberatory furnace, with fifty per cent. (more or less) of its weight (according to the quantity of magnesia present) of sulphuric acid, or of sulphate of soda or potassa, or equivalent, to which an excess of sulphuric acid is added. I prefer, however, sulphuric acid alone. After subjecting to the proper temperature, the whole is ground in a burr-mill with water, and lixiviated with water in a tank heated by a jet of steam, to remove the sulphate of magnesia formed. If the oxide of nickel should contain some copper or cobalt, those metals are, for the most part, extracted as sulphates by adding a little more sulphuric acid and managing carefully the heat. They can then be removed at the same time and along with the sulphate of magnesia.

Thirdly, to remove the silica, I heat the oxides (free of sulphate of lime and magnesia) in crucibles, or in a reverberatory furnace, with caustic potassa or soda, or carbonates or equivalent. The quantity of the latter necessary will vary with the amount of silica present. About seventy-five per cent. of its weight will be sufficient in most cases. After calcination, the mass is to be ground and washed, as has been described for the removal of magnesia. The oxides are then to be boiled with diluted acid, (hydrochloric acid preferred,) to remove the last trace of silica, after which they are to be washed and dried. They are then ready for use, or may be reduced to the metallic state.

The extraction of the magnesia may also be effected (if in small quantity) at the same time with the silica by treating with caustic potassa or soda, or their carbonates or equivalent, and dissolving in acid.

By treating the impure oxide, especially that kind which contains a large proportion of impurities, with sulphuric acid in a tank, I obtain a sulphate solution of the metals, the sulphate of lime and silica being left as an insoluble residue. This sulphate solution is concentrated by evaporation, so that it will crystallize; or the impure oxide may, by being first treated with sulphuric acid, be freed of magnesia; afterward of the sulphate of lime and silica by treating it with a solution of carbonate of soda; or it may be calcined with soda, to remove the sulphate of lime and silica.

When the metallic sulphate is crystallized, as before described, it is calcined with care, so as not to decompose the sulphate of magnesia, but only to convert the metallic sulphate into oxide. The oxide is freed of the sulphate of magnesia and of such small portions of the sulphate of lime which may remain by lixiviation, and is then ready for use. The caustic potassa or soda, or their carbonates or equivalent, employed in the calcination for the extracting of the silica is again used, in the state of solution, for the decomposition of the sulphate of lime, and the sulphate of soda formed in the said decomposition can be evaporated and used, with addition of some sulphuric acid, for the extraction of the magnesia.

What I claim as my invention, and desire to secure by Letters Patent, is—

The treatment of metallic oxides for their purification, substantially as herein set forth.

ALFRED MONNIER.

Witnesses:

WM. F. MCNAMARA,

ALEX. F. ROBERTS.